Figure 1:
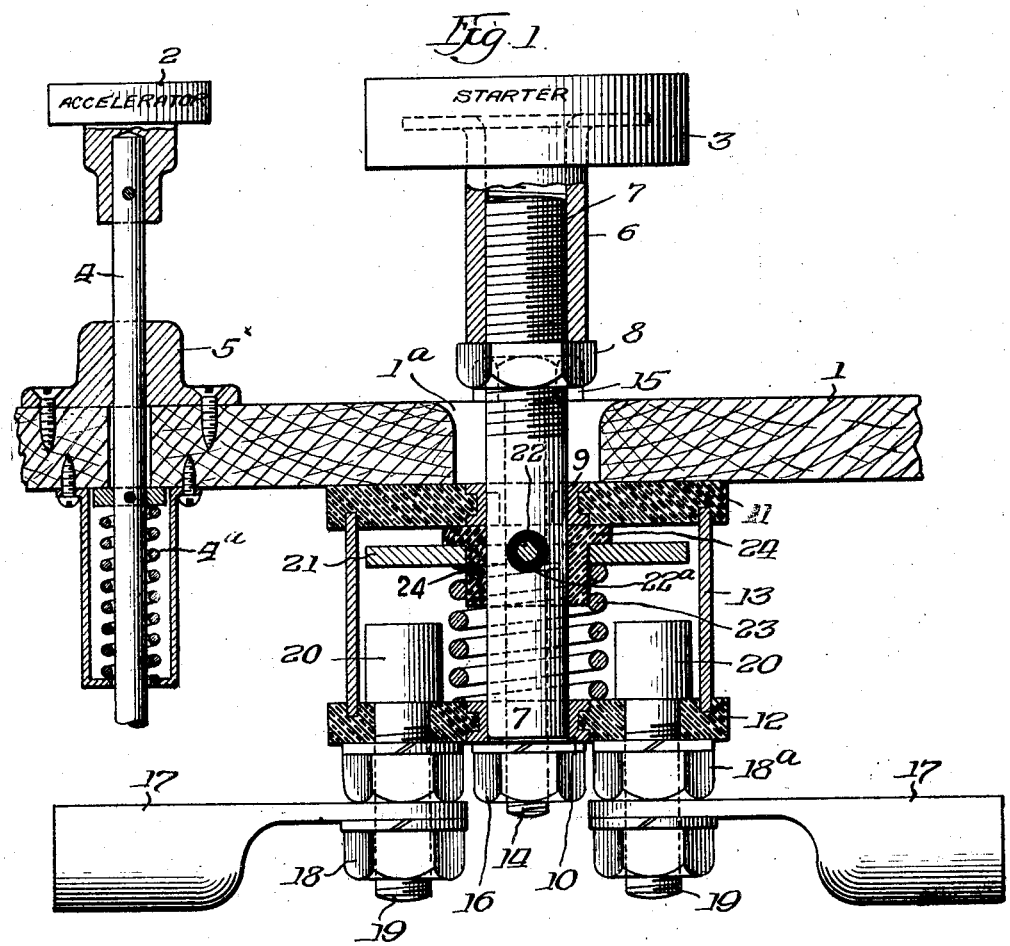

Feb. 3, 1931.                L. M. WILLIAMS                1,791,087
STARTING SWITCH
Filed March 2, 1928

Witness:                                    Inventor:
                                            Lloyd M. Williams,
                                    By Wilkinson, Huxley, Byron & Knight
                                            Attys.

Patented Feb. 3, 1931

1,791,087

UNITED STATES PATENT OFFICE

LLOYD M. WILLIAMS, OF CHICAGO, ILLINOIS, ASSIGNOR TO JANE A. WILLIAMS, OF CHICAGO, ILLINOIS

STARTING SWITCH

Application filed March 2, 1928. Serial No. 258,505.

This invention resides primarily in a foot control for automobiles characterized by the novelty of having the starter pedal that controls the switch that starts the engine and the so-called accelerator pedal that controls the power output of the engine, so related that they are both subject to operation from one and the same position of the foot of the operator, and having each of said pedals resiliently supported to admit of the displacement incident to the performance of their intended functions; the starter pedal, however, yielding only to a pressure that is materially greater than that to which the accelerator pedal will yield, so that the starter pedal may serve as the footrest for the accelerator pedal and yet remain responsive at all times to a sufficiently large yet not inconvenient application of force in case an emergency, such as the stalling of the engine, makes it necessary to throw the starting motor into operation.

Otherwise stated, the primary novelty of this invention consists in providing for an automobile accelerator, a footrest that is resiliently supported in a manner to render it displaceable for development of movement required to operate the starter, but with its resistance to such displacement so determined that it will remain immovable under any load incident to its use as a rest upon which to rock the foot in displacing the accelerator pedal, but will yield to an intended excessive or abnormal pressure of the foot when it becomes necessary to start the motor. Heretofore starter pedals have been so located that they could not be reached by the driver's foot without removing the foot from the normal operating position, which is inconvenient, besides placing the driver at a disadvantage in case the car stalls in an emergency; moreover, foot operated switches as heretofore constructed have generally been so designed that it was necessary to mount the switch upon the starting motor or some other substantial part of the motor plant, the pedal alone being mounted in the floor before the driver's seat, and special connection between the pedal and the switch being required.

Collateral novelty of the present invention, and particularly novelty incident to the preferred embodiment of the invention, consists in so combining the starter pedal with the starting switch that it will not only offer sufficient resistance to depression to enable it to serve as the foot rest, and yet be depressible under a positive and intentionally applied force of the foot, but the switch will be adapted for mounting immediately beneath and supported by the floor of the driver's foot space and will be very much more durable and efficient in construction than starting switches as heretofore made.

In the accompanying drawing, in which the preferred embodiment of the invention is shown by way of illustration—

Figure 2:
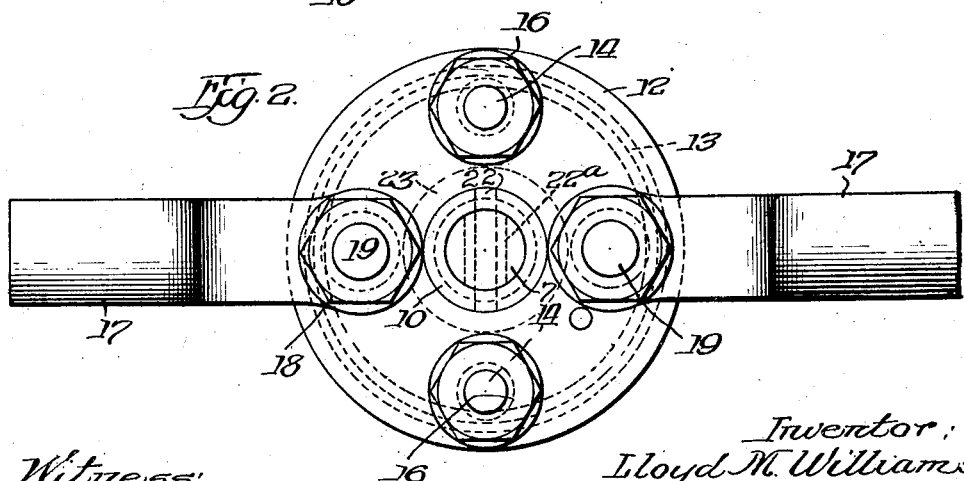

Figure 1 is a vertical section through a portion of the floor of the driver's foot space in an automobile, the plane of section being taken through the axis of the accelerator and of the foot switch; and Figure 2 is a bottom plan view of the foot switch.

1 represents the floor of the automobile, 2 the pedal end of the accelerator, and 3 the pedal of the starting switch. The pedals 2 and 3 are so related in positions that the driver's foot may rest upon both simultaneously, and particularly may rest upon the starter pedal 3 while the foot is being rocked sidewise to develop vertical pressure upon the pedal 2, so that the starting switch pedal serves as the foot rest for the accelerator. The accelerator pedal 2 is mounted upon the single vertical plunger 4 guided in a suitable bearing such as 5.

The starting switch comprises a shank 6 which carries the pedal 3, threaded upon the upper end of a longitudinally reciprocating plunger 7 in a manner to render it vertically adjustable and level with the accelerator 2; the adjustment being fixed through means of the jamb nut 8; and plunger 7 is guided in its vertical movements by the upper bushing 9 and lower bushing 10 in two insulating housing disks 11 and 12 which are spaced apart by the cylindrical wall 13 but drawn against said wall to complete the housing, and at the same time held firmly to the underside of the floor 1 by means of bolts 14 carrying heads 15 and nuts 16. An opening 1a in the floor 1 receives the jamb nut 8 in the depression of the starting pedal and permits a sufficient range of such depression to operate the motor circuit switch hereinafter described.

17 represents the separated ends of the starter circuit which are to be connected by the starter switch, and these are secured by nuts 18 upon the shanks 19 of the terminals 20 which are in the form of bolt heads presented within the housing and in the path of a bridging disk 21 which is fitted snugly around the sleeve 24 and seated against the flange of said sleeve by the compression spring 23, said sleeve 24 being secured to plunger 7 by means of pin 22, insulated in the plunger by a bushing 22a. The pin 22 terminates at its ends flush with the outer surface of the portion of the sleeve 24 upon which the disk 21 fits, and said disk overlies the ends of and prevents said pin from becoming displaced. The disk 21 is provided with suitable openings or recesses to receive the mounting bolts 14 and to permit free sliding relative thereto. Preferably, additional nuts 18a are also fitted to the shanks 19 of the terminals 20 for the dual purpose of clamping the terminals 20 tightly to the disk 12 and permitting the nuts 18 to serve as jamb nuts on the said shanks. Disk 21, as well as the plunger 7 of the starter pedal 3, is held normally lifted by means of the spring 23 confined between disk 21 and lower housing disk 12, spring 23 being centered by the insulating bushing 24 which also insulates the spring and the disk from the plunger and limits the upward or return movement of the plunger 7. Bushing 24 permits bridging disk 21 sufficient freedom upon plunger 7 to insure bearing of the bridging disk upon both terminals 20.

From the foregoing description it will be seen that the invention contemplates a control for internal combustion engines comprising two foot actuated elements that combine to induce the running of the engine, which said elements are so related that they may simultaneously receive the foot of the operator; are so arranged that both may be displaced in substantially the same direction by one and the same application of force from the foot; and one of them has a return spring which, while yielding to a predetermined pressure of the foot, will normally support the foot as a rest, in position to act upon the other element at times when their joint action is not required.

The starter pedal is rigid against lateral displacement, and spring 23 is of sufficient strength to resist the pressure of the driver's foot exerted in resting the foot while depressing the accelerator 2, as when the foot is rocked from side to side in actuating the accelerator. In other words, the pedal 3 while depressible for starting the motor, is sustained with sufficient force to adapt it to serve as a footrest for the said accelerator.

The described construction, as will readily be seen, admits of very ready and convenient assembly of the switch as well as the disassembly of its parts should it become necessary to adjust or repair them, or substitute one spring 23 for another in developing the degree of resistance which a driver prefers in the footrest function of the starting switch.

I claim:

1. In foot controls for automobiles, the combination of an accelerator pedal and a starter pedal located one adjacent to the other in positions to receive simultaneously the foot of the driver and respond to one and the same thrust of the foot, the starter pedal having an inherent resistance to foot movement sufficient to support the foot while the latter is operating upon the accelerator.

2. In foot controls for automobiles, the combination of an accelerator pedal and a starter pedal located one adjacent to the other in positions to receive simultaneously the foot of the driver, the starter pedal being movable under pressure of the foot to start the motor but having an inherent resistance to such movement sufficient to support the foot while the latter is operating upon the accelerator; said accelerator pedal and starter pedal having their operating movements substantially in one and the same direction and being displaceable by one and the same thrust of the foot; and said starter pedal having means for fixing it in operative positions at different elevations, and thereby bring it into proper relative position to the accelerator pedal.

3. In foot controls for automobiles, the combination of an accelerator pedal and a starter pedal located one adjacent to the other in positions to receive simultaneously the foot of the driver, the starter pedal being movable under pressure of the foot to start the motor but having an inherent resistance to such movement sufficient to support the foot while the latter is normally operating upon the accelerator; said starter pedal having an operating movement in substantially the same direction as that in which the accelerator pedal moves and being substantially rigid against transverse movement.

4. In foot controls for automobiles, the combination of an accelerator pedal having connections through which it controls the speed of the motor, and a starter pedal having connections through which it controls the starting of the motor; said pedals being positioned relatively to each other to bring them simultaneously within reach of the foot of the driver, and said pedals having substantially parallel operating movements in one and the same direction; the starter pedal having resilient means sustaining it against movement and adapting it to serve as a footrest during normal operating movement of the accelerator pedal.

5. In foot controls for automobiles, the combination of an accelerator pedal and a starter pedal positioned side by side and simultaneously within reach of the foot of the driver, said pedals having means transmitting their movements incident to their functions, which consist of plungers mounted for longitudinal movement in substantially parallel lines substantially in one and the same direction and having resilient means for resisting their said movements, the resilient means of the starter pedal being materially greater than that of the accelerator pedal.

6. In foot controls for automobiles, the combination of an accelerator pedal and a starter pedal, said pedals being positioned to simultaneously receive the foot of the driver, and constructed to respond to a single impulse of the foot substantially in one and the same direction, means opposing the movement of each of said pedals, the resistance to movement of said starter pedal being substantially greater than the resistance to movement of the accelerator pedal whereby the starter pedal normally serves as a foot rest during the operation of said accelerator pedal.

7. In foot controls for automobiles, the combination of a floor board, an accelerator pedal and a starter pedal both constructed to operate by pressure of the foot in substantially one and the same direction relative to said floor board, said pedals being located side by side to simultaneously receive the foot of the driver whereby both of said pedals may be operated by the movement of the driver's foot in the said one direction, resilient means opposing the movement of the accelerator pedal and resilient means opposing the movement of the starter pedal, the resistance to movement of said starter pedal being substantially greater than the resistance to movement of said accelerator pedal whereby said starter pedal normally serves as a foot rest during the operation of said accelerator pedal by rocking movement of the driver's foot.

8. In foot controls for automobiles, the combination of a floor board, an accelerator pedal and a starter pedal mounted on said floor board, said pedals being arranged for movement in substantially the same direction in response to one and the same impulse of the operator's foot, resilient means beneath the floor imposing a substantially greater resistance to the movement of said starter pedal whereby said starter pedal normally serves as a foot rest during the operation of said accelerator pedal by the rocking movement of an operator's foot.

9. In a foot control for internal combustion engines, the combination of two foot actuated elements adapted to simultaneously influence the running of the engine, said elements being associated in position to adapt them to simultaneously receive the foot of the operator and respond in their functioning movements to one and the same thrust of the foot; one of said elements being provided with a return spring having an inherent resistance which, while yielding to a predetermined pressure of the foot, will normally support the foot as a rest in position to press upon the other element at times when it is functioning alone.

Signed at Chicago, Illinois, this 27th day of February, 1928.

LLOYD M. WILLIAMS.